Dec. 13, 1955 M. W. STRICKLER 2,726,421
APPARATUS FOR CLEANING ANIMAL INTESTINES
Original Filed July 3, 1952 2 Sheets-Sheet 1
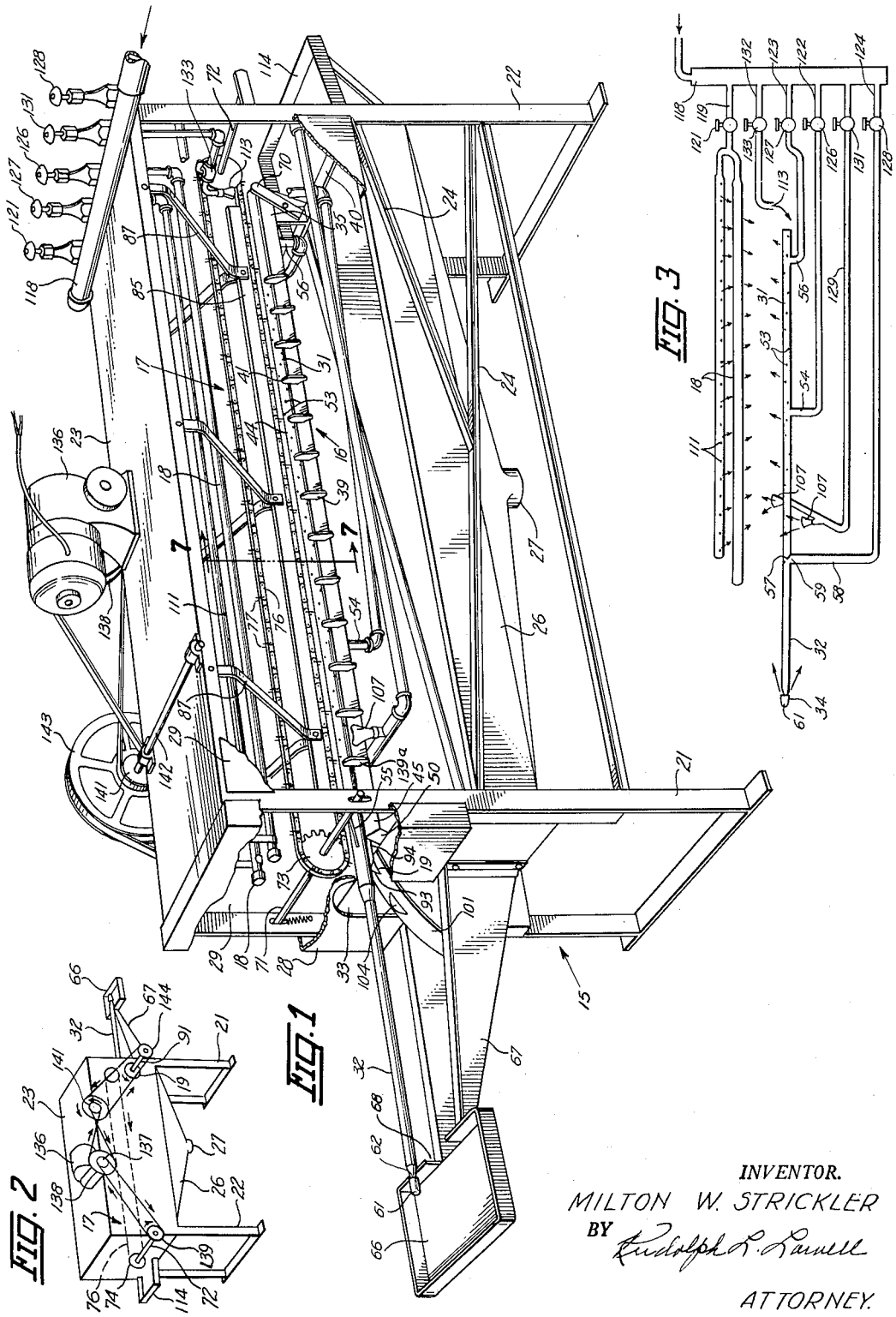
INVENTOR.
MILTON W. STRICKLER
BY
ATTORNEY.

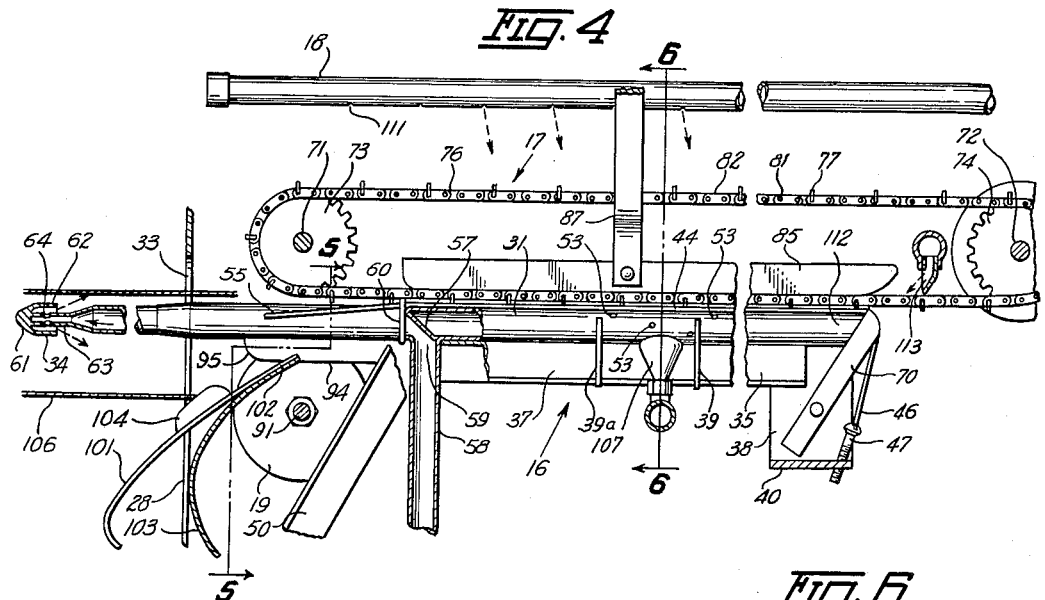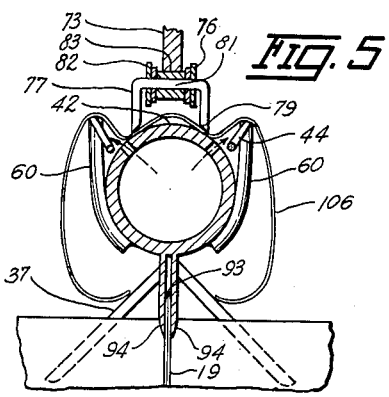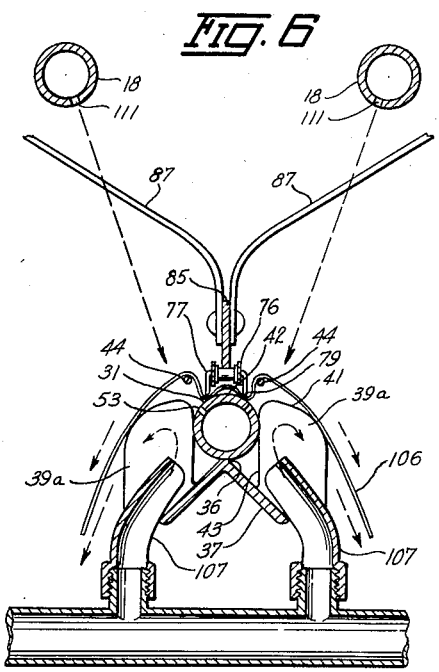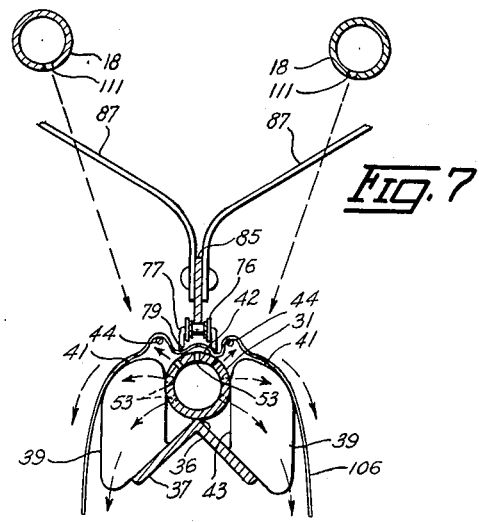

United States Patent Office 2,726,421
Patented Dec. 13, 1955

2,726,421

APPARATUS FOR CLEANING ANIMAL INTESTINES

Milton W. Strickler, Des Moines, Iowa

Original application July 3, 1952, Serial No. 297,103, now Patent No. 2,701,386, dated February 8, 1955. Divided and this application August 13, 1954, Serial No. 449,555

9 Claims. (Cl. 17—43)

This invention relates generally to meat cleaning machines and in particular to apparatus for cleaning animal intestines or casings, commonly referred to as chitterlings. This application is a division of my prior co-pending application Serial No. 297,103, filed July 3, 1952, now Patent No. 2,701,386, issued February 8, 1955.

The cleaning of chitterlings in packing houses, so far as is known, is substantially an all manual procedure, both as to the slitting of the intestine for the removal of offal, and the removal from the slit intestine of all adhering offal particles. Although chitterlings are not extensively sold, and are primarily a by-product in the packing plants, the cost of labor for preparing and cleaning the same for use is rather prohibitive because of the inconvenience and discomfort to the worker, namely, the work is undesirable, and labor for such purpose is at a premium. Also considerable difficulty is encountered in the thorough cleaning of the chitterling or intestine.

It is an object of this invention, therefore, to provide an improved apparatus for cleaning animal intestines.

A further object of this invention is to provide a machine for cleaning chitterlings which requires a minimum of manual attention and completely eliminates the discomfort and distastefulness now generally encountered in a chitterling cleaning operation.

Another object of this invention is to provide apparatus for cleaning animal intestines wherein an intestine is slit and then cleaned by having it move in succession against a cutter unit and then between oppositely directed jets of a washing fluid.

Another object of this invention is to provide an intestine cleaning machine in which the intestine, in a filled condition, is initially manually fed to the machine, and is then slit and the offal removed and washed therefrom, prior to again being manually handled.

Still a further object of this invention is to provide a chitterling cleaning machine in which the intestine, on being slit longitudinally thereof, is movably supported in a spread position and carried through oppositely directed jets of water, concurrently with being flexed, so as to be washed clean of all offal particles.

Another object of this invention is to provide a chitterling cleaning machine in which the filled intestine is slipped over an end of a fluid carrying pipe provided with a flushing nozzle. An upwardly extended cutter protecting member engages and creases the lower side of the intestine ahead of a cutting unit to move foreign objects in the offal, such as stone and metal pieces, to opposite sides of the crease and out of the cutting zone of the cutter unit, whereby to appreciably extend the service life of the cutter unit.

A further object of this invention is to provide a machine for cleaning animal intestines which is of a simple and rugged construction, economical in cost, capable of being maintained in continuous operation, and efficient in operation to clean intestines that will pass government inspection.

Further objects, features and advantages of this invention will become apparent from the following description when taken in connection with the accompanying drawing in which:

Fig. 1 is a perspective view of the intestine cleaning machine of this invention, with certain parts broken away for the purpose of clarity;

Fig. 2 is a diagrammatic perspective view of the machine showing the power transmission system therefor;

Fig. 3 is a diagrammatic showing of the fluid or hydraulic system used in the machine shown in Fig. 1;

Fig. 4 is an enlarged foreshortened fragmentary longitudinal sectional view of the machine shown in Fig. 1;

Fig. 5 is an enlarged sectional detail view taken along the line 5—5 in Fig. 4;

Fig. 6 is an enlarged transverse sectional view as seen on the line 6—6 in Fig. 4; and Fig. 7 is an enlarged transverse sectional view taken along the line 7—7 in Fig. 1.

With reference to the drawing the intestine or chitterling cleaning machine of this invention is shown in Fig. 1 as including a main frame structure designated generally as 15, an intestine supporting and washing unit 16 extended longitudinally of the frame 15, an endless conveyor 17 for moving or feeding an intestine on the supporting unit 16, fluid discharge or spray members 18 for washing the top surface of an intestine as it is moved along the unit 16, and a cutter unit 19 for longitudinally slitting the intestine prior to the action thereon by the spray members 18 in the washing unit 16.

The frame 15 is comprised of a pair of longitudinally spaced transverse end structures 21 and 22 connected across their upper ends by a top cover section 23 and intermediate their ends by brace members 24. For the convenience of description the end structure 21 will be referred to as the front end structure of the machine. Arranged below the supporting unit 16 is a sump or drain tank 26 having an outlet 27. The frame 15, between the tank 26 and the top cover section 23, is provided at its front end with a cover plate 28 and at the sides thereof with cover plates 29 to direct water, as will later appear, into the tank 26.

The supporting unit 16 (Figs. 1 and 4) is comprised of a pipe or fluid carrying member 31 extended longitudinally of the frame 15 between the end structures 21 and 22, and is integrally formed with a reduced front section 32 which projects forwardly from the front end structure 21 through an opening 33 in the cover plate 28. This front section 32 terminates in a nozzle unit 34.

The pipe 31, between the end structures 21 and 22, has its bottom side secured (Figs. 6 and 7), to the apex 36 of an angle iron support 37, extended longitudinally of the frame 15 and arranged so that the V shape of the transverse cross section is inverted. The rear end 35 of the angle iron support 37 is carried on an upright support 38 (Fig. 4) secured to a transverse cross member 40 which forms part of the rear frame structure 22. The front end 45 of the angle iron support 37 is secured to an upright member 50 suitably carried on the front frame structure 21.

Spaced longitudinally on the pipe member 31, between the end frame structures 21 and 22, are a plurality of combination support and spreader members 39 which extend laterally in opposite directions from the pipe 31. As shown in Fig. 7 the members 39 are arranged in upright positions and have their top surfaces 41 of an arcuate or curved shape, inclined generally downwardly from a position below the level of the top side 42 of the pipe 31. In other words, the top side 42 of the pipe 31 forms what might be termed a high spot between a pair of correspondingly oppositely arranged combination members 39. Each member 39 is formed of a flat metal material with its lower side secured to the angle iron support 37 and its inner side 43 extended upwardly for attachment to a side wall of the pipe 31.

Extended longitudinally of the frame 15 at positions above and to opposite sides of the pipe 31 are a pair of supporting rods or wires 44. These wires are arranged in vertical planes corresponding substantially to the planes of the inner sides 43 of the combination members 39, and have their front ends 55 fastened to opposite sides of the pipe 31 (Fig. 4). From their front ends 55 the wires 44 are progressively raised and spread apart to positions above and at opposite sides of the pipe 31, by their support on a pair of oppositely arranged upright legs or pins 60 secured to opposite sides of the pipe 31. The wires 44 then extend rearwardly in a spaced parallel relation over the supports 70, secured to the upright plate 38, for attachment of the rear ends 46 to tension adjusting screws 47 which are threadably supported on the cross member 40 of the rear end frame 22. The wires are thus maintained in a suspended position over substantially the full length of the pipe between the end structures 21 and 22.

The pipe 31 (Figs. 1 and 7) over substantially the length thereof between the end frame structures 21 and 22 is formed with a plurality of discharge orifices 53 arranged in serpentine rows longitudinally of the pipe so as to direct fluid from the pipe in directions generally upwardly and laterally therefrom. In order to maintain a full and uniform flow of fluid from the discharge orifices 53, the pipe 31 has a pair of spaced inlet connections 54 and 56 arranged between the front end frame structure 21 and the rear frame structure 22.

At substantially the junction of the pipe 31 with its reduced front extension 32, and as best appears in Figs. 3 and 4, there is arranged within the pipe 31 a transverse partition plate 57, so that all the fluid supplied by the inlets 54 and 56 is discharged from the orifices 53, namely, from the pipe 31 over its length located rearwardly of the partition plate 57.

A third fluid inlet 58 (Figs. 3 and 4) for the pipe 31 is located forwardly of the partition plate 57 which is inclined upwardly and forwardly from the bottom side of the pipe 31 so as to extend across the inlet opening 59 of the inlet connection 58. Fluid from the inlet 58 travels forwardly in the reduced pipe extension 32 into the nozzle unit 34 which includes a head member 61 formed with a rearwardly extended peripheral rim of flange 62 arranged in a spaced relation about the restricted front end portion 63 of the pipe extension 32. The end portion 63 is formed with a plurality of discharge openings 64, so that water from the orifices 64 is directed by the peripheral flange 62 in a reversed or rearward flow about the outside of the pipe extension 32. It can thus been seen that the nozzle 34 constitutes an outlet for the pipe 31. Arranged below the nozzle unit 34 (Fig. 1) is an intestine or chitterling receiving tray 66 which is carried at the front end of a trough member 67, the rear end of which is secured to the frame end structure 21 and open to the tank 26. Any material or water in the tray 66 passes into the trough 67 through a cutaway portion 68 formed in the rear side of the tray 66.

Suitably supported for rotation in the end frame structures 21 and 22 are a pair of transverse shafts 71 and 72 which carry sprockets 73 and 74, respectively. Trained about the sprockets 73 and 74 for movement longitudinally of the frame 15 is an endless sprocket chain 76 of a roller or link type. Extended outwardly from the chain 76 are oppositely arranged pairs of fingers 77 which terminate in pointed ends 79. As shown in Fig. 5 the fingers 77 are integrally formed as a part of the connecting pins 81 for the links 82 connecting the rollers 83 of the chain 76 and have their pointed ends 79 terminating adjacent the top surface of the pipe 31, when the chain 76 is traveling thereover. To maintain the travel of the lower flight of the chain 76 in a straight line adjacent to the pipe 31, namely, travel without slack or lateral movement, a track member 85 comprising an elongated bar, is positioned above the lower flight of the chain, and between the sprockets 73 and 74, for riding engagement on the rollers 83 at a position between oppositely arranged roller links 82. The track member 85 is supported from the top frame section 23 by brace or connecting members 87. (Fig. 1). The front transverse shaft 71 is supported for yieldable up and down movement for a purpose to later appear.

Arranged below the front transverse shaft 71, and carried on the front frame structure 21, is a transverse shaft 91 which carries the cutting unit 19. The unit 19 consists of a rotary blade which is arranged in a substantially common vertical plane with the sprocket 73, and which plane also includes the longitudinal axis of the pipe member 31 (Fig. 5). The top edge 93 of the rotary knife or cutting unit 19 is located adjacent to the underside of the pipe 31 and is received in a straddling relation between a pair of downwardly extended stationary knives 94 which are suitably secured to the underside of the pipe 31, with the leading or front edges 95 of the stationary knives 94 being inclined downwardly and rearwardly from the pipe 31 as best appears in Fig. 4.

Extended through the opening 33 in the front cover plate 28 is what might be termed a guide member 101 which is of a curved shape extending downwardly and forwardly from a position below the stationary cutting blades 94 into the rear end of the trough 67 (Figs 1 and 4). The rear end 102 of the guide member 101 is secured to a guard member 103 suitably attached to the front end structure 21 and located rearwardly of the guide member 101 and the rotary cutting unit 19 passes through the joined rear ends of the guide member 101 and guard member 103 so that only the top portion of the rotary knife 19 is exposed.

Projected upwardly from the guide member 101 at a position forwardly of, and in the plane of the rotary cutting knife 19, is a knife protector member 104. The upper surface of the protector member 104 is of a curved convex shape, and s spaced downwardly from the bottom side of the pipe 31.

In use, the machine is adapted to clean intestines of varying sizes and in one embodiment of the invention the pipe 31 has a diameter of about one and one half inches, and will effectively carry intestines having diameters, when filled, of from four to six inches, namely, the large colon or intestine of a hog. The intestine to be cleaned is carried on the trough 66 and one end thereof is initially inserted or positioned over the nozzle unit 34. The intestine, shown at 106 in Fig. 4 is thus supported or hung at its top side from the reduced pipe section 32, so as to hang downwardly therefrom. The water discharged from the nozzle 34 immediately effects a flushing action on the offal within the intestine 106 so that offal is removed from the intestine for dropping into the trough 67 concurrently with the moving of the intestine on the pipe section 32 in a direction toward the front frame structure 21. In this connection, it is to be noted that the rearward flow of the water discharged from the nozzle 34 acts to move the intestine along the pipe concurrently with removing or washing offal therefrom. The flushing action of the nozzle 34 is also complemented by what might be termed a loosening of offal within the intestine. In other words, appreciable offal remains in the intestine as it approaches the rotary cutting unit 19.

In this approach, the bottom side of the intestine 106 is initially engaged by the protector member 104 which functions to form a crease or depression in the bottom side of the intestine in longitudinal alignment with the cutting knife 19. By thus raising the bottom side of the intestine 106, at the longitudinal center thereof, the portions of the intestine to opposite sides of the member 104 form separate holding sacks. Any solid or abrasive materials in the intestine, such as rocks, pieces of metal and the like, thus tend to drop into such oppositely formed sacks away from the bottom of the crease or depression formed by the protector member 104. As a result, this foreign abrasive material within the intestine 106 is moved out of the path or cutting zone of the knife 19 so as to appreciably increase the service life of the knife.

On being engaged by the knife 19, the intestine is concurrently engaged by the stationary knives 94 so that the bottom side of the intestine is slit longitudinally of the intestine by the cooperative action of the rotary knife 19 with the stationary knives 94. These stationary knives 94 also perform the function of keeping the rotary knife 19 free from being clogged or wadded. Thus many of the intestines to be cleaned include partially digested materials such as hay, grass and grain, which, on being partially cut by the knife 19, tend to cling to the knife and thus impair its clean cutting function.

As the intestine 106 moves against the rotating knife 19 it is continuously slit longitudinally thereof along its bottom side. On being cut or slit, the contents remaining within the intestine drop downwardly out of the intestine and into the trough 67 and the tank 26. Concurrently with being engaged by the cutter 19, the top side of the intestine 106 passes between the top side of the pipe 31 and the feeding chain 76, at the front sprocket 73, for engagement by the pickup fingers 77. On being engaged by the pickup fingers 77 the intestine is automatically fed through the machine. In this feeding action the opened intestine, as best appears in Fig. 5, is initially progressively raised on the supporting wires or rods 44 to a first spread position, terminating in what might be termed a full spread position when the intestine is supported over the combination members 39. Thus, as shown in Fig. 7, the wires 44 are at positions above the top surfaces 41 of the combination members 39 to permit the intestine being hung or supported over the combination members 39 when it reaches the wire support 60. Further, it will be noted that the intestine 106, between the supporting wires 44 is depressed or held adjacent the top side of the pipe 31 by the pickup fingers 77, and then from each wire 44 extends downwardly over the support members 39.

As the leading end of the intestine 106 passes over the first pair of combination members, indicated as 39a in Fig. 4, the under or lower surface of the intestine 106 is concurrently acted upon by jets of fluid discharged from the orifices 53 in the pipe 31, and from a pair of oppositely arranged sprays 107 arranged below the pipe 31 and directed upwardly toward each other. These sprays act to initially flush or knock off the greater part of the offal remaining on the intestine after the emptying of the same at the rotary knife 19. As the intestine passes out of the zone of action of the sprays 107 the under surface thereof is continuously acted upon and cleaned by the upwardly and laterally directed jets of fluid discharged from the orifices 53.

In this connection, it is to be noted that the members 39 function not only to support the intestine in its spread out position, but are also in scraping engagement with portions of the intestine to opposite sides of the pipe 31. As a result of this scraping engagement the intestine 106 tends to be successively engaged and then released by the members 39 to produce a flexing or bending action in the intestine concurrently with its movement longitudinally of the pipe 31. This flexing action tends to break away small particles of offal from the under surface of the intestine, concurrently with changing the angle of the surface portions that are acted upon by the jets from the orifices 53, to further produce a scaling of adhering particles from the intestine.

Simultaneously with the washing action on the lower surface of the intestine 106 by the jets discharged from the pipe 31, the top surface of the intestine 106 is subjected to the washing and cleaning action of jets directed downwardly from the pipes 18 through discharge openings 111 formed therein. The openings 111 direct jets from the pipes 18 downwardly and inwardly so as to initially contact the top surface of the intestine 106 at positions to opposite sides of the feeder chain 76. Water from the pipes 18 thus washes over the complete top surface of the intestine.

In order to maintain the intestine 106 in a spread or open position, as it passes along the pipe 31, the fluid pressures within the pipes 18 and 31 are suitably controlled to prevent the intestine 106 from being folded back against itself by a too strong action of the upwardly directed jets. Thus, the pressure of the jets may be adjusted to give a thorough cleaning and washing action, concurrently with a counter balancing action between the upwardly and downwardly directed jets, to maintain the intestine in an open position.

As the intestine passes off of the rear end 112 of the supporting unit 16 the top surface thereof is subjected to the action of a downwardly directed spray 113 (Fig. 4) of sufficient pressure and velocity to disengage the intestine from the pickup fingers 77. Along with effecting the release of the intestine from the fingers 77, the spray 113 serves further to give a final washing or cleansing action to the top surface of the intestine. From the supporting unit 16 the cleaned intestine drops into a receiving tray 114 extended rearwardly from the rear frame structure 22.

As shown in Fig. 3 water is supplied to the machine of this invention from a suitable source of water under pressure into a header 118 carried on the top frame section 23 adjacent the rear frame structure 22. The water to the pipes 18 is supplied from a common feed line 119, connected to the header 118 and provided with a control valve 121. The inlets 54, 56 and 58 to the pipe 31 have separate feeder lines 122, 123 and 124, respectively, connected with the header 118, and having corresponding valves 126, 127 and 128, also, respectively. The sprays 107 have a common feeder line 129 equipped with a control valve 131 and connected to the header 118. The release jet 113 is connected to the header 118 through a feeder line 132 which is provided with a control valve 133. It is seen, therefore, that the pressure and velocity of the jets from the pipes 18 are controlled independently of the jets from the pipe 31, and that the water admitted to the two inlets 54 and 56 for the pipe 31, is independently controlled so as to provide for an accurate adjustment of the jet pressures.

As shown in Figs. 1 and 2 the machine is equipped with an electric motor and gear reduction unit 136 mounted on the top cover section 23. Mounted on the drive shaft of the unit 136 is a small pulley 137 and a large pulley 138. The pulley 137 is belt connected with a pulley 139 mounted on the transverse shaft 72 for driving the feeder chain 76. The large pulley 138 is connected with a smaller pulley 141 mounted on a counter shaft 142 rotatably supported on the top section 23. A second larger pulley 143 on the counter shaft 142 is belt connected with a pulley 144 mounted on the shaft 91 for driving the rotary cutting knife 19.

It is seen, therefore, that the machine of this invention is of an economical construction, and capable of being readily moved to any desired location within a cleaning room, since it requires only connections with a source of electrical power for the unit 136, and with a source of water supply to the header 118 to be completely operative.

Although the invention has been described with respect to a preferred embodiment thereof, it is to be understood that it is not to be so limited since changes and modifications can be made therein which are within the full intended scope of this invention as defined by the appended claims.

I claim:

1. Apparatus for cleaning animal intestines comprising a fluid carrying elongated horizontal member having upwardly directed discharge openings therein, a feed member movable longitudinally of said fluid carrying member, a plurality of intestine engaging fingers members carried by said feed member, whereby an opened animal intestine positioned on said fluid carrying member is engaged by said finger members and moved longitudinally along said fluid carrying member, and a second fluid carrying member positioned above said first fluid carrying member and having discharge openings formed therein directed downwardly toward said first fluid carrying member, whereby the opposite surfaces of said intestine are cleaned by the fluid discharged from said fluid carrying members during the movement of said intestine by said feed member.

2. Apparatus for cleaning animal intestines comprising a fluid carrying member, means carried by said member and extended longitudinally thereof for supporting an opened intestine in a spread position adjacent said member, means positioned above said fluid carrying member and engageable with an opened intestine on said supporting means for moving the opened intestine on said supporting means longitudinally of said fluid carrying member, means operatively associated with said fluid carrying member for directing fluid from the fluid carrying member against one side of said opened intestine, and means arranged above said supporting means for directing fluid against the other side of said intestine.

3. Apparatus for cleaning animal intestines comprising a horizontal pipe having a plurality of upwardly directed discharge openings therein, means for supplying fluid under pressure to the interior of said pipe, a conveyor mounted above and adjacent to the top side of said pipe and movable longitudinally of the pipe, a plurality of downwardly extended fingers on said conveyor for engaging an intestine supported on said pipe whereby movement of said conveyor moves said intestine along said pipe so that the bottom side of said intestine is in a position to be cleaned by the fluid issuing from said discharge openings, and means arranged above said pipe for directing jets of fluid against the top surface of said intestine concurrently with the discharge of fluid from said discharge openings.

4. Apparatus for cleaning animal intestines comprising a first horizontal tubular member having a top surface formed with upwardly directed discharge openings, spreader members attached to the sides of said tubular member at longitudinally spaced positions, each of said spreader members consisting of an upright plate having the top surface thereof adjacent the top surface of said tubular member and extended laterally and downwardly therefrom, a second tubular member positioned above said first tubular member and having discharge openings formed therein directed downwardly toward said first tubular member, and means operatively associated with said tubular members for supplying fluid under pressure thereto, whereby an opened animal intestine moved along the top surface of said first tubular member and spread out on said spreader members has the opposite sides thereof washed by the fluid discharged from said tubular members.

5. Apparatus for cleaning animal intestines comprising a substantially horizontal pipe having a bottom side, an inlet and an outlet, a source of fluid supply connected to the inlet for said pipe, means on the outlet for said pipe for directing fluid from said outlet toward the inlet for said pipe, an upright cutting unit mounted adjacent the bottom side of said pipe and extended longitudinally thereof intermediate the inlet and outlet for the pipe, an upright member positioned in the plane of said cutting unit to the side thereof adjacent the outlet, with the top of said upright member being positioned slightly below the top of said cutting unit, whereby an intestine positioned about and moved along said pipe from the outlet toward the inlet has the lower side thereof longitudinally creased by said upright member for cutting on said crease by said cutting unit.

6. In a machine for cleaning animal intestines, a longitudinally extended frame structure, a fluid carrying member having fluid discharge openings formed in the peripheral surface thereof attached to and extended longitudinally of said frame structure, intestine feeding means carried by said frame structure, finger members secured to said feeding means and extended into close proximity with said fluid carrying member, a second fluid carrying member positioned above said first fluid carrying member and having downwardly directed discharge openings formed therein for directing jets of fluid toward said first fluid carrying member, and means operatively associated with said fluid carrying members for supplying fluid under pressure thereto.

7. A machine for cleaning animal intestines comprising a frame structure, intestine supporting means carried by and extended longitudinally of said frame structure, a vertically extended intestine slitting cutter unit supported at one end of said frame structure, means on said frame for moving an intestine slit by said cutter unit along said supporting means for one end of said frame structure toward the other end thereof, and means on said frame for directing streams of fluid against opposite top and bottom sides of an intestine being moved along said supporting means by said moving means.

8. Apparatus for cleaning animal intestines comprising a longitudinally extended intestine supporting member, an upright movable cutting unit positioned below said supporting member and extended longitudinally thereof for slitting an intestine supported on said supporting member, and an upright stationary knife member carried by said supporting member and extended downwardly therefrom to a position adjacent said cutting unit for cooperation therewith in slitting an intestine.

9. For use in an animal intestine cleaning machine which includes a frame structure, a longitudinally extended intestine supporting member on said frame structure, means carried by the frame structure for moving an intestine along said supporting member and fluid discharge means mounted on the frame structure for directing fluid against an intestine on said supporting member; an upright rotary cutting knife positioned below said supporting member and extended longitudinally thereof for slitting an intestine supported thereon, and a pair of upright stationary knife members carried by said supporting member and extended downwardly therefrom to positions adjacent transversely opposite sides of said knife for cooperation therewith in slitting an intestine.

References Cited in the file of this patent
UNITED STATES PATENTS

| | | |
|---|---|---|
| 550,986 | Lowry | Dec. 10, 1895 |
| 1,479,104 | Lytle | Jan. 1, 1924 |
| 2,641,020 | Clemens et al. | June 9, 1953 |